United States Patent Office 3,084,338
Patented Apr. 2, 1963

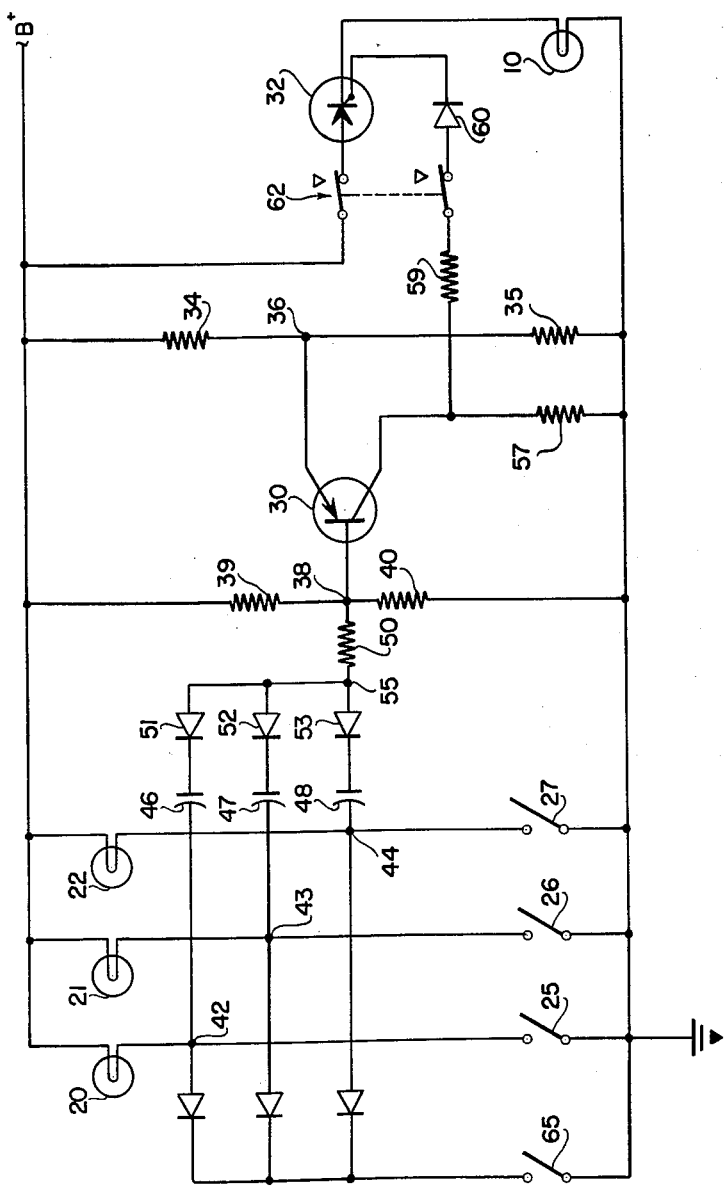

3,084,338
MASTER CAUTION LIGHT CONTROL
Robert C. Mauer, Sunland, and Robert S. Leventhal and Willem F. Tenge, Van Nuys, Calif., assignors to Lockheed Aircraft Corporation, Burbank, Calif.
Filed July 29, 1960, Ser. No. 46,137
2 Claims. (Cl. 340—213)

This invention pertains to a warning light system which will give a visual indication of a predetermined situation or malfunction of a circuit or system. More particularly, it pertains to a warning light system which includes a master caution light which will respond to the lighting of any one of a plurality of warning lights.

In many situations, it is desirable to provide means whereby a person in a confined space may be apprised of the condition of a plurality of circuits and systems. It frequently occurs that condition indicating means for each of the plurality of circuits and systems may not be crowded into the small space occupied by the person monitoring these systems. Such is the case in an aircraft where an engineer or pilot occupies a relatively small compartment but must be apprised of all conditions throughout the aircraft. It is desirable to provide a single signal at the monitoring panel and to have a plurality indicating means at the system or circuitry being monitored or at some location other than the compartment, each to indicate a condition in a smaller part of the whole circuitry or system. The master light which gives indication of malfunction in the compartment will respond where any one of a plurality of individual warning lights is ignited due to malfunction in its individual circuit. Thus the monitoring person will be apprised of malfunction by the single master caution light and will proceed to the equipment in question to locate the particular circuit within the entire system which has malfunctioned by locating a particular warning light which has ignited.

To date, such systems utilize relays. Obviously where relays are involved, there are moving parts. Moving parts add additional weight and are more apt to fail than a system involving only static electronic circuitry.

It is therefore an object of this invention to provide a warning light system which is light in weight and has no mechanical parts or movements.

It is another object of this invention to provide a warning light system which includes a master caution light at a remote location, which master caution light will function even though an individual warning light is burned out. Parallel circuitry is utilized to trigger the master caution light when the condition to be indicated occurs so that it will light regardless of whether the individual warning light is operative.

It is another object of the present invention to provide a master caution light control which will give an indication of a condition in an individual circuit but which may be reset to indicate later malfunction of other circuits in the same system even though the condition persists in the first circuit.

In the FIGURE a single B+ voltage source supplies the voltage to a plurality of warning lamps 20, 21, and 22 which are connected to individual circuits to be monitored represented by switches 25, 26, and 27. Should a predetermined condition occur such as a malfunction in any circuit, its switch will close the circuit from B+ through one of lights 20, 21, or 22 to ground. The lights 20, 21, and 22 will be located on an indicator panel near the monitored circuitry while the master caution light 10 will be located on a master panel where several master caution lights will each represent a plurality of warning lights.

The PNP transistor 30 forms the heart of an amplification network which will trigger the silicon controlled rectifier 32 to ignite the master caution light 10. The resistors 34 and 35 form a voltage dividing network to produce a voltage at point 36 which is slightly lower than the voltage at point 38 produced by voltage dividing resistors 39 and 40. Thus the voltage supplied to the base of transistor 30 from point 38 will be higher than the emitter voltage supplied from point 36 thereby keeping transistor 30 cut off. There is no current through warning lights 20, 21, 22; therefore, the points 42, 43, 44 are approximately at the B+ voltage. There will be a slight voltage drop across resistor 50 and the diodes 51, 52, and 53, but none across the condensers 46, 47, and 48 when switches 25, 26, and 27 are open.

If switch 25 is closed by reason of malfunction or otherwise, the point 42 will be at ground potential. The capacitor 46 momentarily retains its zero voltage drop condition; therefore, point 55 senses a voltage decrease equivalent to the B+ source and point 38 drops nearly to zero. The capacitor 46 begins to charge immediately but the momentary low voltage at point 38 allows the transistor 30 to pass a pulse of current across resistor 57 to ground, and current flows through limiting resistor 59 through blocking diode 60 to trigger the silicon controlled rectifier 32. The silicon controlled rectifier then fires to complete a circuit from B+ through master caution light 10 to ground. This will give an indication to the monitoring person that there is a malfunction in any one of a plurality of individual circuits.

After the individual circuit is identified, lamp 10 may be extinguished by opening the double-pole reset switch 62 to break the circuit to the silicon controlled rectifier 32. Reset switch 62 is then closed in preparation for further monitoring. Then should any of the remaining switches 26 or 27 be closed, the master caution light would be again lighted even though switch 25 was still closed and the first light 20 still ignited.

Note that even though the warning lights 20, 21, or 22 are burned out so that a circuit cannot be completed through them to ground, the closing of any of the switches 25, 26, or 27 will cause one of the three points 42, 43, or 44 to go to ground to cause one of the three condensers 46, 47, or 48 to charge to cause transistor 30 to fire silicon controlled rectifier 32 to ignite master light 10. Thus a back-up feature is provided for the warning light system.

A separate circuit closed by switch 65 is provided in order to test the circuitry lamps 20, 21, 22 and master caution light 10. There can be more than the three warning lights 20, 21, 22 and are limited only by the combined reverse leakage through diodes 51, 52, and 53. Warning lights 20, 21, and 22 are shown as floating ungrounded lamps. Should grounded lights be used, a properly biased NPN transistor will be used and diodes 51, 52, and 53 reversed.

The circuitry shown in the figure and described in this specification provides a simple, low-cost, light weight, reliable warning light system having a master caution light located at a remote position. Having described the details of my invention, I desire and claim the following combinations and their equivalents as my invention.

1. A master caution light control comprised of a plurality of warning lights each connected to a voltage source, a normally open switch between each warning light and ground, a silicon controlled rectifier connected to the voltage source, a master caution light connected to the silicon controlled rectifier to ground, a first voltage divider connected between the voltage source and ground, means to tap a voltage from the first voltage divider to the emitter of a PNP transistor, a second voltage divider between the voltage source and ground, means to tap the second voltage divider at a voltage above the voltage of the first tapped voltage, means to connect the second tapped voltage to the base of the PNP transistor, a resistor to connect the second tapped voltage through a diode and a condenser to each warning light and its switch, means to connect the collector of the PNP transistor through a resistor to the gate of the silicon controlled rectifier and means to connect the collector of the PNP transistor to ground so that when any of the switches is closed, the voltage of the base of the PNP transistor will be caused to drop thereby causing the transistor to conduct supplying a pulse to the gate of the silicon controlled rectifier to light the master caution light.

2. A master caution light control comprised of a plurality of warning lights each connected to a voltage source, a normally open switch between each warning light and ground, a silicon controlled rectifier connected to the voltage source, a master caution light connected to the silicon controlled rectifier to ground, a first voltage divider connected between the voltage source and ground, means to tap a voltage from the first voltage divider to the emitter of a PNP transistor, a second voltage divider between the voltage source and ground, means to tap the second voltage divider at a voltage above the voltage of the first tapped voltage, means to connect the second tapped voltage to the base of the PNP transistor, a resistor to connect the second tapped voltage through a diode and a condenser to each warning light and its switch, means to connect the collector of the PNP transistor through a resistor to the gate of the silicon controlled rectifier and means to connect the collector of the PNP transistor to ground so that when any of the switches is closed, the voltage of the base of the PNP transistor will be caused to drop thereby causing the transistor to conduct supplying a pulse to the gate of the silicon controlled rectifier to light the master caution light, and means to extinguish the master caution light including means to break the circuit between the voltage source and the silicon controlled rectifier and means to break the circuit between the collector of the transistor and the gate of the silicon controlled rectifier.

References Cited in the file of this patent

UNITED STATES PATENTS

| | | |
|---|---|---|
| 2,840,804 | Rodgers | June 24, 1958 |
| 2,876,387 | Doeleman | Mar. 3, 1959 |
| 2,917,731 | Rodgers | Dec. 15, 1959 |

OTHER REFERENCES

Notes on the application Controlled Rectifier, December 1958, pages 28, 45, and 54.